April 28, 1925.

A. C. HAYDEN 1,535,602

RADIO TUNING DEVICE

Filed May 24, 1922

INVENTOR:
Arthur C. Hayden
BY
Henry T. Williams
ATTORNEY

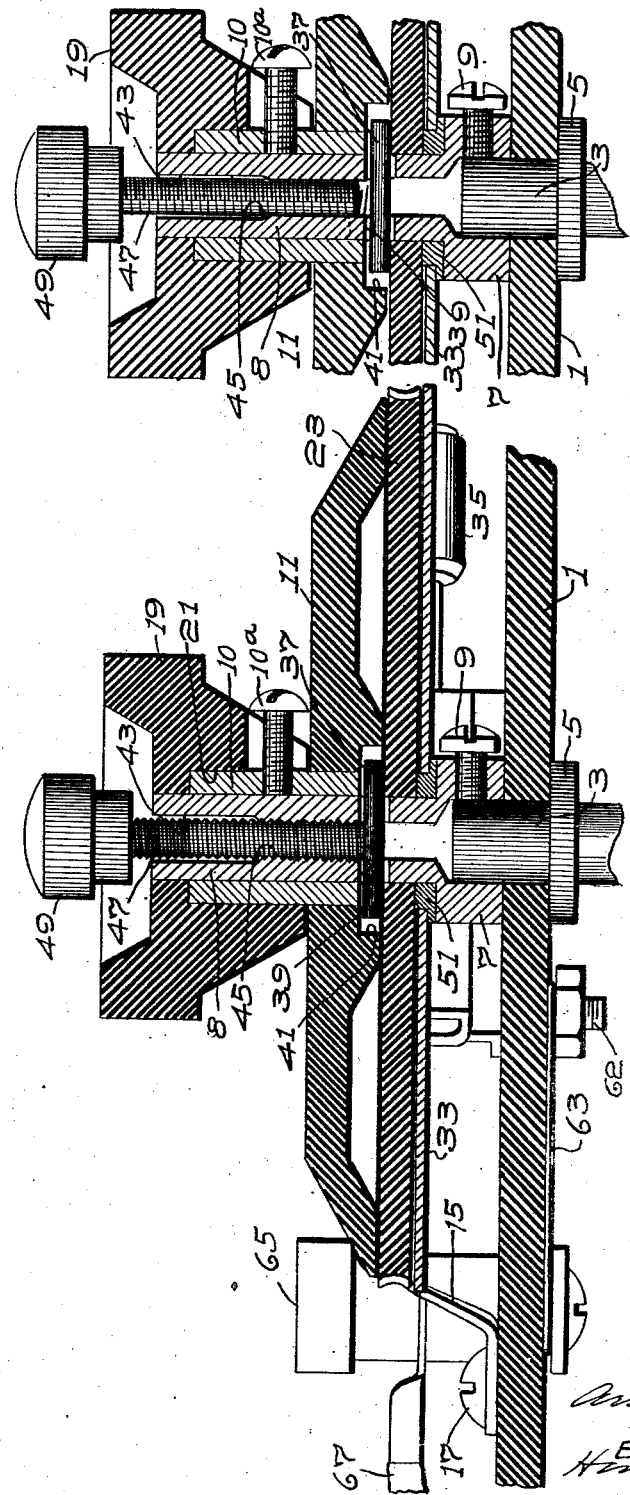

April 28, 1925.

A. C. HAYDEN 1,535,602

RADIO TUNING DEVICE

Filed May 24, 1922

INVENTOR:
Arthur C. Hayden
BY
Henry T. Williams
ATTORNEY

Patented Apr. 28, 1925.

1,535,602

UNITED STATES PATENT OFFICE.

ARTHUR C. HAYDEN, OF BROCKTON, MASSACHUSETTS.

RADIO TUNING DEVICE.

Application filed May 24, 1922. Serial No. 563,221.

*To all whom it may concern:*

Be it known that I, ARTHUR C. HAYDEN, a citizen of the United States, residing at Brockton, in the county of Plymouth and State of Massachusetts, have invented certain new and useful Improvements in Radio Tuning Devices, of which the following is a specification.

The invention to be hereinafter described relates to devices for tuning radio receivers, and among other objects provides a device whereby the tuning may be accomplished with a desirable fineness of adjustment.

It sometimes happens that several sending stations are transmitting signals of the same wave length, and it is difficult for the operator to so tune the receiver as to eliminate the signals of a given station.

The device of the present invention enables the radiofrequency tuning to be accomplished with a desirable fineness of adjustment, so that the receiving operator may tune the receiving apparatus to bring out the sound clear and loud for most efficient effect, and may readily select the transmitting station from which he will receive, without interference from other transmitting stations.

The character of the invention will be best understood by reference to the following description of one good form thereof shown in the accompanying drawings, wherein.

Figure 1:
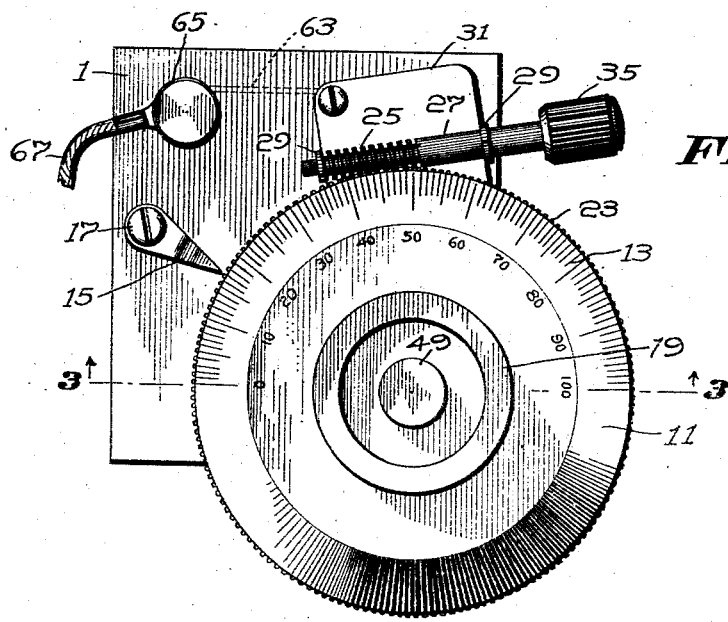
Fig. 1 is a plan of the tuning device shown herein as an illustrative embodiment of the invention.
Figure 2:
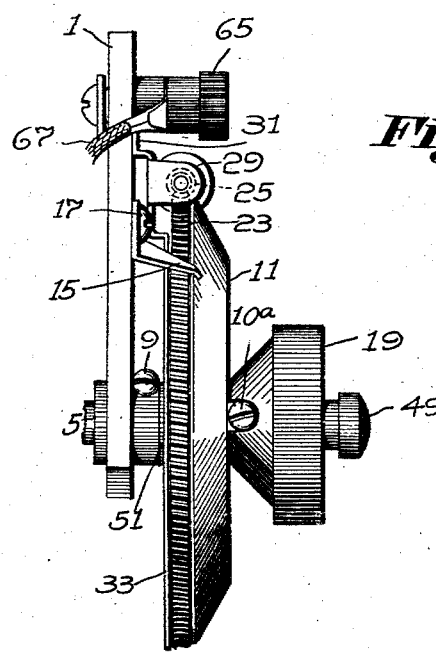
Fig. 2 is a side elevation of the device shown in Fig. 1.
Figure 5:
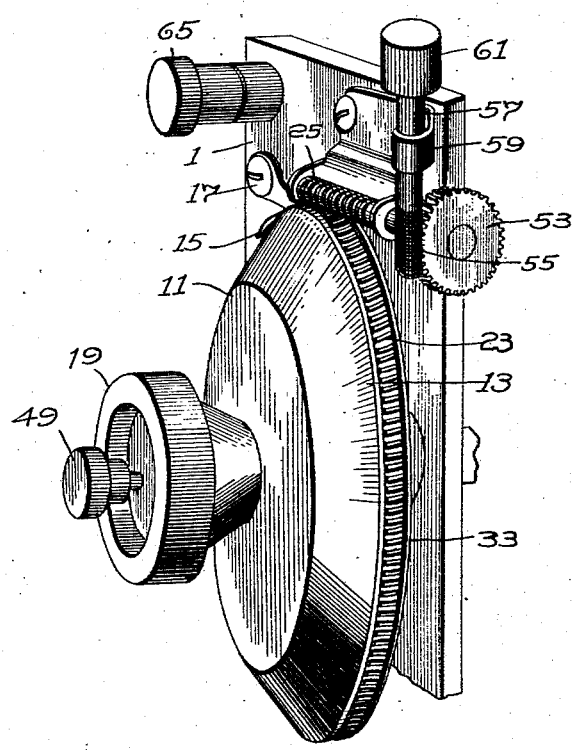

Fig. 3 on an enlarged scale is a vertical section taken on line 3—3 of Fig. 1;

Fig. 4 is a sectional view of parts shown in Fig. 3, but in a different position; and Fig. 5 is a perspective view of a modified form of the invention.

Referring to the drawings, the radio tuning device shown therein as one good form of the invention, comprises a support desirably in the form of a panel 1 provided with a shaft 3 journaled in said panel and having a flange 5 engaging one face of said panel. This shaft is entered into a socket in a head 7 of a shaft 8 and is secured therein by a set screw 9. The shaft 3 is broken away and may be suitably connected to any device for controlling the frequency determining elements of the receiving system, such, for example, as a variable condenser, or a variometer. Since these are of usual well known construction, it is unnecessary to show and describe the same herein.

Mounted on the shaft 8 is a sleeve 10 which is secured to said shaft by a set screw 10ª. Mounted fast on the sleeve is a disk wheel 11 of rubber or other insulation material. The peripheral portion of this disk wheel is bevelled, and has a scale 13 thereon comprising graduations marked at intervals with suitable numbers. Cooperating with the scale is an index arm 15 secured on the panel by a screw 17. A knob 19 is fitted on the upper end of the shaft 8, and has a counterbore 21 receiving the sleeve 10. The set screw 10ª is entered through a hole in the knob 19, and adjustably secures the knob and scale wheel to said shaft.

The knob 19 may be grasped by the operator, and turned to give the scale wheel 11 and the shaft 8 rotative adjustment. This will serve in obtaining a preliminary tuning adjustment, but it is impossible to rotate the knob and wheel by the hand with sufficient fineness of adjustment to meet certain tuning requirements, such, for example, as in eliminating signals from interfering transmitting stations, and in bringing in the signal with desired clearness.

To enable this desirable fineness of adjustment, in the present instance of the invention, a worm gear 23 is mounted loosely on the shaft 8 adjacent to the disk wheel 11, said worm gear being of rubber or other suitable insulation material. Meshing with the worm gear 23 is a worm 25 on a shaft 27 journalled in bearings 29 in an extension 31 of metallic shield plate 33, to be referred to, beneath the worm wheel and centrally apertured to receive the shaft 3. The worm shaft may be provided with a knob 35 within convenient reach of the operator.

Suitable means may be provided to connect the worm gear with the shaft 8, in order that the worm and worm gear may operate to rotate the shaft and the scale wheel when fineness of adjustment is desired. This means, in the present instance of the invention, comprises a cross pin 37 entered through an elliptical hole 39 in the shaft 8 directly above the upper face of the worm gear, the outwardly extending end portions of the pin being accommodated by a recess 41 in the lower face of the scale wheel.

The shaft 8 is provided with a bore 43 having a portion 45 threaded to receive a screw 47 provided with a head 49. The construction is such that when the head 49 is rotated to adjust the screw 47 downward in the bore 43, the lower end of the screw will engage the pin 37 and press the same against the upper face of the worm gear, as will be noted in Fig. 3.

If it is desired to rotatively adjust the shaft 8 by the knob 19, the head 49 of the screw 47 is rotated to release the lower end of the screw from engagement with the pin 37, thereby disconnecting the worm gear from the shaft, as shown in Fig. 4.

Interposed between the head 7 and the shield plate 33 referred to, is a washer 51 of fibre or other insulation material, having a neck projecting upward through and somewhat above the upper face of the shield plate, the construction being such that when the screw 47 presses the transverse pin 37 downward against the worm gear, a small annular portion of the gear will be pressed against the washer, and the latter in turn will be pressed against the shaft head 7, so that the gear will be clamped or securely gripped between the head and washer on one side, and the pin on the opposite side of the gear. There can be no slip or lost motion between the gear and the shaft when the gear is turned by the worm in obtaining fine adjustment. Since the washer 51 is thicker than the gear, the latter is relieved from pressure against the shield plate, which would interfere with free rotative adjustment of the worm gear.

The worm and worm gear device not only serves to give the desirable fineness of adjustment to the shaft, but also the worm will serve automatically to lock the worm gear in its different positions of rotative adjustment. The clamping device in turn will positively secure the gear to the shaft. Thise is important since if the worm and worm gear are to be effective in locking the shaft in its positions of adjustment, there must be no slip between the gear and the shaft. Hitherto the shocks and jars which buildings experience from various causes have been liable to result in loss of the fine adjustment of the tuning device, but the locking means of the present invention prevents any possibility of loss of the adjustment.

In some instances it may be desirable to furnish an adjustment which is even finer than that obtained by the device described. To accomplish this, in the present instance, a worm wheel 53 (Fig. 5) may be mounted on the worm shaft 27, and may mesh with a worm 55 on a shaft 57 journalled in a bearing 59 carried by the shield plate extension 31, said shaft being provided with a knob 61 enabling ready manual adjustment.

The construction is such that on rotation of the shaft 57, the worm 55 will rotate the worm gear 53, and the latter will rotate the worm 25, which will in turn rotate the worm gear 23. Thus, the shaft 3 may be given a rotative adjustment so slight as to be imperceptible.

The shield plate extension 31 may be secured by a bolt 62 to the panel, and said bolt may be electrically connected by a wire 63 with a binding post 65 which may be grounded through a wire 67.

When the operator presents his hand to the tuning device for the purpose of adjusting the same, a portion of the electrical charge stored in the condenser may pass therefrom into his hand and to the ground, resulting in an objectionable noise. The provision of the metal shield plate referred to, beneath the worm gear and hence between the condenser and the hand of the operator, and the grounding of the metal shield, cause the charge to pass steadily to the ground, and thereby prevent the objectionable noise. This metallic plate also assists in grounding static electricity. The human body has a certain amount of capacity which may be transmitted through the tuning device into the apparatus when the hand is applied either to the knob 19 for preliminary adjustment or to the knobs 35 and 61 for fine adjustment. This is found to produce a howling or serious disturbance, but by the provision of the shield plate back of the knobs, and the grounding of the shield plate, this objectionable effect is materially reduced. This effect is further reduced by the location of the shield in spaced relation with respect to the panel.

Since the plate or member 33 is on the worm gear shaft and carries the worm, it will hold the worm gear and worm in proper meshing relation, and the gear, worm, plate and shaft will constitute a unitary device which may readily be marketed as such. The device may be applied to any panel and its shaft may easily be connected to the tuning instrumentality to be controlled thereby. The bolt 62 connecting the plate extension 31 with the panel will prevent the device as a whole from turning about the shaft.

While the tuning device has been described more particularly in its use for receivers, it will be readily understood by those skilled in the art, that it may also desirably be used for transmitters.

It will be understood that the invention is not limited to the specific embodiment shown, and that various deviations may be made therefrom without departing from the spirit and scope of the appended claims.

What is claimed is:

1. In a radio tuning device, the combination of a panel having a hole therein, a shaft projecting through the hole in the panel with provision for connection with a radio tuning instrumentality, a worm gear on said shaft, a member carried by said shaft and having a part projecting beyond the periphery of the gear, a worm shaft carried by said projecting part and having a worm meshing with said gear, said member serving to hold the worm and gear in intermeshing relation, means to connect the member with the panel and prevent rotation of the member about the shaft, and means detachably to secure the gear to its shaft, said shaft being manually rotative to effect preliminary tuning adjustment of the shaft and said worm being manually rotative to effect fine tuning adjustment of the shaft.

2. In a radio tuning device, the combination of a shaft having provision for connection with a radio tuning instrumentality, a knob on the shaft for giving the same preliminary tuning adjustment, a worm gear on the shaft, a worm meshing with the worm gear, a knob for rotating the worm, a shield plate back of the worm gear and adapted to be grounded, said shaft having a shoulder and a threaded bore, an insulation washer on the shaft between the shoulder and the worm gear and projecting through the shield plate, an element at the opposite side of the gear from the washer and shoulder, and a screw threaded in the bore of the shaft and adapted to adjust said element to confine the gear between the washer and element, said washer being thicker than the shield plate to prevent the gear from being pressed against said plate.

3. In a unitary tuning device, the combination of a small plate for application to a radio panel and having a bearing, a tuning shaft mounted in and projecting through said bearing and adapted for connection with a radio tuning instrumentality, a worm gear on said shaft, said plate having a portion projecting beyond the periphery of said gear, a bearing on said portion of the plate, a shaft journaled in the latter bearing and having a worm thereon, said worm gear shaft and worm shaft, being held by said plate in proper spaced relation thereby to maintain the worm gear and worm positively and permanently in intermeshing engagement, means for causing the tuning shaft to rotate with the worm gear and having provision permitting rotative adjustment of the tuning shaft relatively to the worm gear for preliminary tuning adjustment, said worm shaft being rotatable to operate through the worm and worm gear to give the tuning shaft fine adjustment, and means for connecting said plate to the radio panel.

ARTHUR C. HAYDEN.